(12) United States Patent
Devarapalli (10) Patent No.: US 7,647,427 B1
(45) Date of Patent: Jan. 12, 2010

(54) REDUNDANCY SUPPORT FOR NETWORK ADDRESS TRANSLATION (NAT)

(75) Inventor: Sridhar J. Devarapalli, Sunnyvale, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 855 days.

(21) Appl. No.: 10/273,657

(22) Filed: Oct. 18, 2002

(51) Int. Cl.
*G06F 15/16* (2006.01)
(52) U.S. Cl. .................. 709/245; 709/208; 709/224
(58) Field of Classification Search ............... 709/245, 709/208, 200–203, 217–227
See application file for complete search history.

(56) References Cited

U.S. PATENT DOCUMENTS

| | | | | |
|---|---|---|---|---|
| 6,286,048 | B1 * | 9/2001 | Moberg | 709/225 |
| 6,487,605 | B1 * | 11/2002 | Leung | 709/245 |
| 6,976,090 | B2 * | 12/2005 | Ben-Shaul et al. | 709/246 |
| 7,006,431 | B1 * | 2/2006 | Kanekar et al. | 370/217 |
| 7,042,876 | B1 * | 5/2006 | Jayasenan et al. | 370/389 |
| 7,061,942 | B2 * | 6/2006 | Noronha et al. | 370/537 |
| 7,072,332 | B2 * | 7/2006 | D'Souza | 370/352 |
| 7,139,926 | B1 * | 11/2006 | Madhav et al. | 714/4 |
| 7,227,872 | B1 * | 6/2007 | Biswas et al. | 370/465 |
| 7,308,503 | B2 * | 12/2007 | Giraud et al. | 709/230 |
| 7,380,154 | B2 * | 5/2008 | Gale et al. | 714/4 |
| 7,434,088 | B2 * | 10/2008 | Gale et al. | 714/4 |
| 2006/0120366 | A1 * | 6/2006 | Jayasenan et al. | 370/389 |

OTHER PUBLICATIONS

Foundry Enterprise Configuration and Management Guide, Chapter 13, "Configuring VRRP and VRRPE," copyright 2002; retrieved Sep. 30, 2002, from http://www.foundrynet.com/services/documentation/ecmg/VRRP.html.
Foundry ServerIron® Switch Installation and Configuration Guide, Chapter 7, "Configuring Symmetric SLB and SwitchBack," copyright 2000; retrieved Oct. 7, 2002, from http://www.foundrynet.com/services/documentation/siug/ServerIron_DSR.html.
"Security Solutions" White Paper, Nortel Networks, Nov. 2001.
"End-To-End Security Solutions" White Paper, Nortel Networks, Sep. 2002.
"Optivity Portfolio: Optivity NetID," Nortel Networks, copyright 2002; retrieved Oct. 16, 2002, from http://www.nortelnetworks.com/products/01/optivity/opt_netid/index.html.
"Alteon Web Switching Module: Features & Benefits," Nortel Networks, copyright 2002; retrieved Oct. 17, 2002, from www.nortelnetworks.com/products/01/wsm/fandb.html.

(Continued)

*Primary Examiner*—Moustafa M Meky
(74) *Attorney, Agent, or Firm*—Schwabe, Williamson & Wyatt, P.C.

(57) ABSTRACT

Stateful failover redundancy support is provided for network address translation (NAT). A master NAT device is backed-up with at least one back-up NAT device. Existing sessions are synchronized between the two NAT devices, such as via a dedicated link between them. In the event of a failover where the master NAT device is unable to perform its NAT functions, ownership of Internet protocol (IP) addresses is transferred from the master NAT device to the back-up NAT device. The back-up NAT device, which is now owner of the IP addresses, assumes the NAT functionality associated with these IP addresses and continues the existing sessions, as well as processing new sessions.

11 Claims, 2 Drawing Sheets

OTHER PUBLICATIONS

"Implementing High Availability Layer 4 Services Using VRRP and VRRP Extensions" White Paper, Alteon Web Systems, Inc., Oct. 1999.

"OmniSwitch 7000 Series: Carrier-Class Availability for the Enterprise," Alcatel, 2002.

"OmniSwitch 7000 Series: Carrier Class for the Enterprise," Alcatel, Oct. 2002.

"OmniSwitch 8800 Series: Carrier Class for the Enterprise," Alcatel, Oct. 2002.

* cited by examiner

FIG. 1

FIG. 2

REDUNDANCY SUPPORT FOR NETWORK ADDRESS TRANSLATION (NAT)

BACKGROUND OF THE INVENTION

1. Field of the Invention

This disclosure relates generally to providing redundancy support for network devices. More particularly but not exclusively, the present disclosure relates to providing redundancy support for network address translation (NAT) devices (such as routers or switches) in the event of a failover.

2. Description of the Related Art

Network address translation (NAT) is the translation of an Internet Protocol (IP) address used within one network to a different IP address known within another network. One network is designated as the inside network and the other network is designated as the outside network.

Generally, a company maps its local inside network addresses to one or more global outside IP addresses, and unmaps the global IP addresses on incoming packets back into local IP addresses. This provides a form of security since each outgoing or incoming request must go through a translation process that also offers the opportunity to qualify or authenticate the request or to match it to previous request. Furthermore, the translation processes provides added security in that the internal local IP addresses are kept hidden from outsiders. NAT also conserves on the number of global IP addresses that a company needs, and lets the company use a single (or a few) global IP address in its communication with outsiders.

NAT is typically included as part of a router or other network device, which in turn may form part of a firewall. System administrators create NAT tables that perform the global-to-local and local-to-global IP address mapping. NAT can be statically defined or can be configured to dynamically translate to and from a pool of IP addresses.

Despite the advantages provided by NAT, it nevertheless is prone to problems that typically plague networks. For example, failure (which may be caused by power outages, device malfunction, viruses, etc.) will always occur despite system administrators' best efforts to guard against them. When a failure occurs, NAT is unable to perform address translation and to forward traffic. This down time will continue until the current NAT device (or some other network device that caused the failover) is repaired to bring it back online. In situations where the network may have a backup NAT device, the backup NAT device can be brought online to allow new network traffic to resume—unfortunately, there will still be some downtime and lost traffic (from current connections that were broken at the time of the failover) between the time that the failover occurs and the time that the backup NAT device is brought online.

Failure can also affect transparent cache switching (TCS) functionality. With TCS, commonly accessed web pages are cached so that the requesting client need not access the Internet each time a commonly accessed web page is desired. Instead, the client can access the cached version, thereby reducing latency and bandwidth usage associated with connecting to the Internet. In the event of a failover, the TCS device(s) are unable to provide the client with access to the cache, thus forcing the client to connect to the Internet, if such a connection is even available during the failover. Thus, with TCS systems, a failover can cause latency, downtime, and lost traffic as well.

BRIEF SUMMARY OF THE INVENTION

One aspect of the present invention provides a method for redundancy support. The method includes at a first device, conducting a session related to at least one address from among a plurality of addresses owned by the first device. Session information associated with the conducted session is sent from the first device to a second device. If a failure is detected, the method transfers ownership of the plurality of addresses from the first device to the second device and continues any currently conducted session, corresponding to the session information, at the second device.

DETAILED DESCRIPTION

Embodiments of techniques to provide redundancy support for NAT systems, TCS systems, or other types of applicable systems are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides "stateful failover" (sometimes referred to as "hot failover") redundancy support for NAT. A master NAT device is backed-up with at least one back-up NAT device. Existing sessions are synchronized between the two NAT devices, such as via a dedicated link between them. In the event of a failure where the master NAT device goes down or is otherwise unable to perform its NAT functions, ownership of IP addresses is transferred from the master NAT device to the back-up NAT device. The back-up NAT device, which is now owner of the IP addresses, assumes the NAT functionality associated with these IP addresses and continues the existing sessions, as well as processing new sessions. Thus and in contrast to cold failovers, the hot failover redundancy support provided by one embodiment of the invention does not drop existing connections.

In an embodiment, the two NAT devices are coupled to provide "active-active" redundancy support. That is, even though one of them may be the master NAT device for performing all or most of the address translation and also forwarding traffic, the back-up NAT device may also be performing some address translation and/or forwarding its own traffic, as well as receiving session synchronization information from the master NAT device. In other embodiments, "active-standby" redundancy support is provided, where the back-up NAT device is not forwarding its own traffic while the master NAT device is active, but may still be receiving the session synchronization information.

One embodiment of the invention provides redundancy support for NAT using techniques based on protocols related to Virtual Router Redundancy Protocol (VRRP). For example, an embodiment of the invention may be implemented by applying VRRP-Extended (VRRP-e), used by Foundry Networks, Inc. of San Jose, Calif., to NAT. Additional information about VRRP-e may be found at Foundry Enterprise Configuration and Management Guide, "Configuring VRRP and VRRPE," Chapter 13, copyright 2002. In contrast to VRRP, VRRP-e does not use owners—there all routers are backups for a given IP address—the router with the highest priority becomes master and its back-up will respond to communications to that IP address if the master goes down. Moreover with VRRP, the virtual IP address is also a real IP address of an interface/port—with VRRP-e, the virtual IP address is not a real IP address configured on the interface (e.g., the virtual IP address is not bound to a particular interface).

When VRRP-e is defined on an IP address used by two NAT devices, the two NAT devices share the same virtual Media Access Control (MAC) address for that IP address. However, only one of the NAT devices owns the virtual MAC address at any point in time. The NAT device with the higher priority (e.g., the master or primary NAT device) owns the MAC address, and keeps sending communication messages to its peer(s) (e.g., the back-up or secondary NAT device) to indicate that it is still "alive," in addition to sending the session synchronization information. When the master NAT device goes down, the back-up NAT device detects the gap or other interruption in the communication and takes ownership of the MAC address, and starts forwarding traffic destined for that address.

Embodiments of the invention will be described herein in the context of NAT implementations. It is to be appreciated that other embodiments of the invention may be implemented for TCS or other types systems that use virtual addressing where stateful failover redundancy support is desired.

Figure 1:
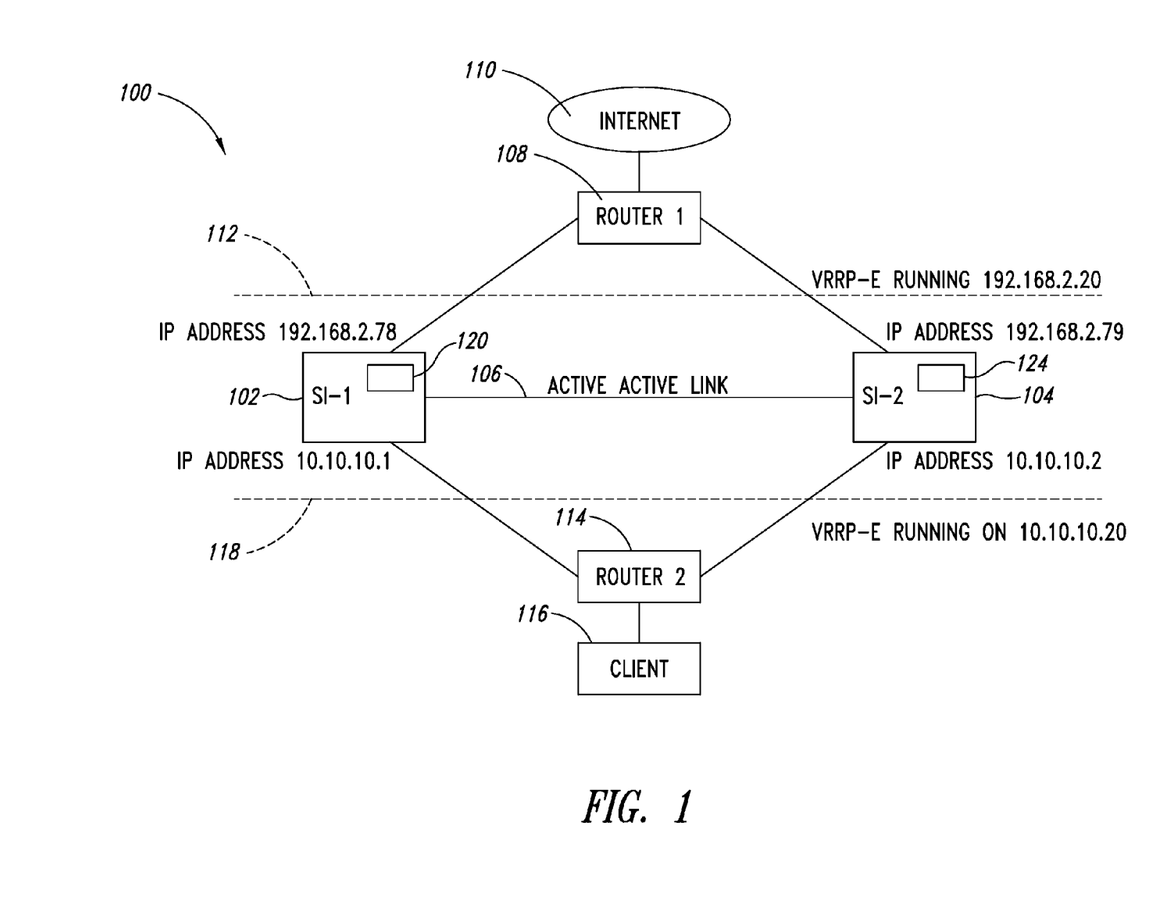
FIG. 1 illustrates a system that provides redundancy support for NAT in accordance with one embodiment of the invention.

FIG. 1 illustrates a system 100 that provides redundancy support for NAT in accordance with one embodiment of the invention. In FIG. 1, various IP addresses are indicated. It is appreciated that these IP addresses are used merely for illustrative purposes to explain operation of an embodiment of the invention, and are not intended to restrict the scope of the invention to the specific addresses shown.

The system 100 includes at least two NAT devices 102 and 104. The NAT devices 102 and 104 can comprise Layer 3 routers, switches, or other type of network device (or combination thereof that are suitable for performing NAT operations to translate addresses. The ServerIron® (SI) switch product provided by Foundry Networks, Inc. of San Jose, Calif. is one example of a device that can be used for the NAT devices 102 and 104 (respectively indicated as SI-1 and SI-2 in FIG. 1).

The NAT devices 102 and 104 are communicatively coupled to one or more outside routers 108 (indicated as "Router 1" in FIG. 1). The outside router 108 is in turn coupled to an Internet 110 or other outside network location.

The NAT device 102 is coupled to the outside router 108 via its outside port having an IP address of 192.168.2.78, for example. Similarly, the NAT device 104 is coupled to the outside router 108 via its outside port having an IP address of 192.168.2.79, for example. However, with VRRP-e, these outside port IP addresses point to a virtual IP address that belongs to a pool of global virtual IP addresses (collectively referred to herein as "NAT addresses"), with 192.168.20 being the base address in the pool (indicated symbolically by a broken line 112 in FIG. 1). The NAT addresses in the pool are the global outside IP addresses to which the internal IP addresses are translated. Thus, packets sent to the outside router 108 from either the NAT device 102 or the NAT device 104 will have a NAT address from the pool as the source address, and return packets sent from the outside router 108 will have that NAT address as the destination address (and will in turn be received by the NAT device that currently owns that virtual IP address, to be translated back into the appropriate internal IP address).

For the inside ports, the NAT device 102 has an example IP address of 10.10.10.1, and the NAT device 104 has an example IP address of 10.10.10.2. These inside ports are coupled to an inside router 114 (indicated as "Router 2" in FIG. 2). The inside router 114 is in turn communicatively coupled to one or more clients 116, which may be servers, hosts, personal computers (PCs), switches, workstations, and the like.

With VRRP-e, these inside port IP addresses are mapped to a virtual IP address that belongs to a list of virtual IP addresses, with 10.10.10.20 being one of the virtual addresses in the list (indicated symbolically by a broken line 118 in FIG. 1) that is shared by both NAT devices 102 and 104. Thus, packets from the inside router 114 will be sent to 10.10.10.20, which will then be received by the NAT device 102 or 104 that currently owns that address.

To further illustrate configuration of NAT addresses for active-active redundancy support, the following configuration operations may be performed. It is appreciated that the format and content of these configuration operations will vary from one implementation to another, and are not intended to be restrictive of the invention.

SI-1(config)# ip nat inside source list 1 pool test

SI-1(config)# ip nat pool test 192.168.2.20 192.168.2.70 prefix-length 24

SI-1(config)# access-list 1 permit 10.10.10.0/24

SI-1(config-if-1/1)# ip address 10.10.10.1/24

SI-1(config-if-11)# ip nat inside

SI-1(config-if-1/10)# ip address 192.168.2.78/24

SI-1(config-if-1/10)# ip nat outside

The "ip nat inside source list 1 pool test" command specifies that any packet having an address belonging to "list 1" should be translated to one of the addresses belonging to "pool test." The pool test addresses are the global NAT outside IP addresses, which in this example are the IP addresses in the range from 192.168.2.20 to 192.168.2.70 specified in the second configuration command above. The list 1 addresses are the inside IP addresses in the range 10.10.10.1 to 10.10.10.255 specified above. The configuration commands above also designate 10.10.10.1 as the inside address of the NAT device 102 that is to receive traffic from the inside router 114, and 192.168.2.78 as the outside address of the NAT device 102 that is to receive traffic from the outside router 108.

Such configuration operations may be performed on both the NAT devices 102 and 104 (e.g., both NAT devices should run the same configuration in one embodiment). Therefore, the IP addresses of the ports of both the NAT devices 102 and 104 will be different, but they will run VRRP-e on the same IP addresses, which in this case are 10.10.10.20 (on the inside port or interface) and 192.168.2.20 (the base address of the NAT pool). VRRP-e need not be run on the IP addresses of the outside ports 192.168.2.78 and 192.168.2.79.

The following configuration commands may be used to configure VRRP-e for inside source static NAT. That is, these configuration commands may be used to provide redundancy support for a single NAT IP address that is statically mapped to a single inside source IP address. It is noted that the addresses indicated in these configuration commands do not necessarily pertain to FIG. 1, and are instead intended to provide illustrative examples.

ServerIron(config)# ip nat inside source static 10.10.10.10 192.168.2.78

ServerIron(config)#int e 1/1

ServerIron(config-if-e100-1/1)#ip address 192.168.2.79/24

ServerIron(config-if-e100-1/1)# ip vrrp-extended vrid 1

ServerIron(config-if-e100-1/1)# backup

ServerIron(config-if-e100-1/1)# ip address 192.168.2.78

ServerIron(config-if-e100-1/1)# activate

The first line of the configuration command specifies a 1 to 1 mapping (or translation) from an inside address of 10.10.10.10, which is the source of a packet, to a NAT address of 192.168.2.78. The subsequent lines of configuration commands configure VRRP-e for the IP address 192.168.2.78. The "backup" command allows application of VRRP-e where there is no "owner" of an IP address, and therefore, both the devices 102 and 104 are configured as backup for that IP address. The master is decided based on the priority that can be assigned.

Another set of configuration commands can include the following:

ServerIron(config)# ip nat inside source list 1 pool test

ServerIron(config)# ip nat pool test 192.168.2.20 192.168.2.40 pre 24

ServerIron(config))#int e1/1

ServerIron(config-if-e100-1/1)# ip address 192.168.2.79/24

ServerIron(config-if-e100-1/1)# ip vrrp-extended vrid 1

ServerIron(config-if-e100-1/1)# backup

ServerIron(config-if-e100-1/1)# ip address 192.168.2.20

ServerIron(config-if-e100-1/1)# activate

For inside destination static NAT, where there is a 1 to 1 static mapping of an outside NAT address to an inside destination address that is to receive a return packet, the configuration commands are similar to the above. Except, however, the "ip nat inside source static" command is replaced with an "ip nat inside destination static" command. VRRP-e is configured similarly for the NAT address 192.168.2.78.

For implementations where the NAT addresses belong to a pool, VRRP-e is configured for the base address. For example for inside source dynamic NAT, the following configuration commands may be used:

ServerIron(config)# ip nat inside source list 1 pool test.

ServerIron(config)# ip nat pool test 192.168.2.1 192.168.2.40 prefix-length 24

The first configuration command above defines the mapping of one of the inside addresses to any one of the NAT addresses in the pool. The second configuration command defines the NAT pool, where 192.168.2.1 is the base address in the pool. Therefore, one embodiment of the invention applies configuring redundancy support for only this base address 192.168.2.1, and in so doing, also provides redundancy support for other addresses in its pool that have the subnet address of 192.168.2. That is, one embodiment of the invention need not configure VRRP-e for every address in the pool-rather, VRRP-e is applied to the base address in the pool, and in the event of a failure affecting any address in the pool, that address is identified as belonging to the pool and failover support can be provided from the back-up NAT device that has been associated to the base address.

The following configuration commands are used for inside destination dynamic NAT.

(ServerIron)#ip nat inside destination list 1 pool test.

(ServerIron)#access-list 1 permit 192.168.2.0/24.

For inside destination dynamic NAT, incoming connections from the router 108 are made to an IP address belonging to the "access list." This destination IP address is then translated to an internal address specified in the pool. For example, if a connection is initiated to the IP address 192.168.2.30 (which is contained in the access-list 1), this destination IP address is translated to one of the addresses belonging to "pool test." As for VRRP-e, VRRP-e has to be configured on any address belonging to the access-list 1 (e.g., 192.168.2.30). This will ensure redundancy support for all the IP addresses belonging to access-list 1.

Referring back to FIG. 1, a communication link 106 is coupled to ports of the NAT devices 102 and 104. The communication link 106 may be hardwired or wireless. In an embodiment, the communication link 106 carries both session synchronization information and communication messages that indicate that the master NAT device is "alive." That is, assuming for illustrative purposes that the NAT device 102 is the active master NAT device and that the NAT device 104 is the back up, the NAT device 102 sends its current session information and "alive" communication messages to the NAT device 104 via the communication link 106. In one embodiment, both of these types of messages exchanged between the NAT devices 102 and 104 can comprise Layer 3 packets.

The ports of the NAT devices 102 and 104 that are coupled to the communication link 106 may be configured as "server active-active ports," such as if ServerIron® devices are used. The purpose of this or other similar configuration is to identify, for the software, the ports that are to send and receive session synchronization information. In an embodiment, the "alive" communication messages are not sent via the communication link 106, and are instead sent out via some other connection(s). In an alternative embodiment, the "alive" messages may be sent via the communication link 106. Additional information regarding active-active port configuration for ServerIron® devices are described in further detail in Foundry ServerIron® Switch Installation and Configuration Guide, "Configuring Symmetric SLB and SwitchBack," Chapter 7, copyright 2000, as well as in other available Foundry Networks documentation, all of which are incorporated herein by reference.

In an embodiment, the ports of the NAT devices 102 and 104 that are coupled to the communication link 106 belong to a separate virtual local area network (VLAN) than that used for network traffic. By placing the communication link 106 on a separate VLAN, the communication link 106 is placed on a separate Layer 2 broadcast domain, thereby avoiding undesirable Layer 2 loops with other links that carry network traffic.

In another embodiment, the devices 102 and 104 can comprise transparent cache switching (TCS) devices. The communication link 106 can allow both TCS devices to share the same cached data. If the master TCS device fails, the back-up TCS device can take over the sessions currently being handled by the master TCS device, since the back-up TCS device has the same cached data. Also, the addresses owned by the master TCS device is transferred to the back-up TCS device, so that all future traffic related to these addresses can be processed by the back-up TCS device for caching, fetching, forwarding, or other operation.

Figure 2:
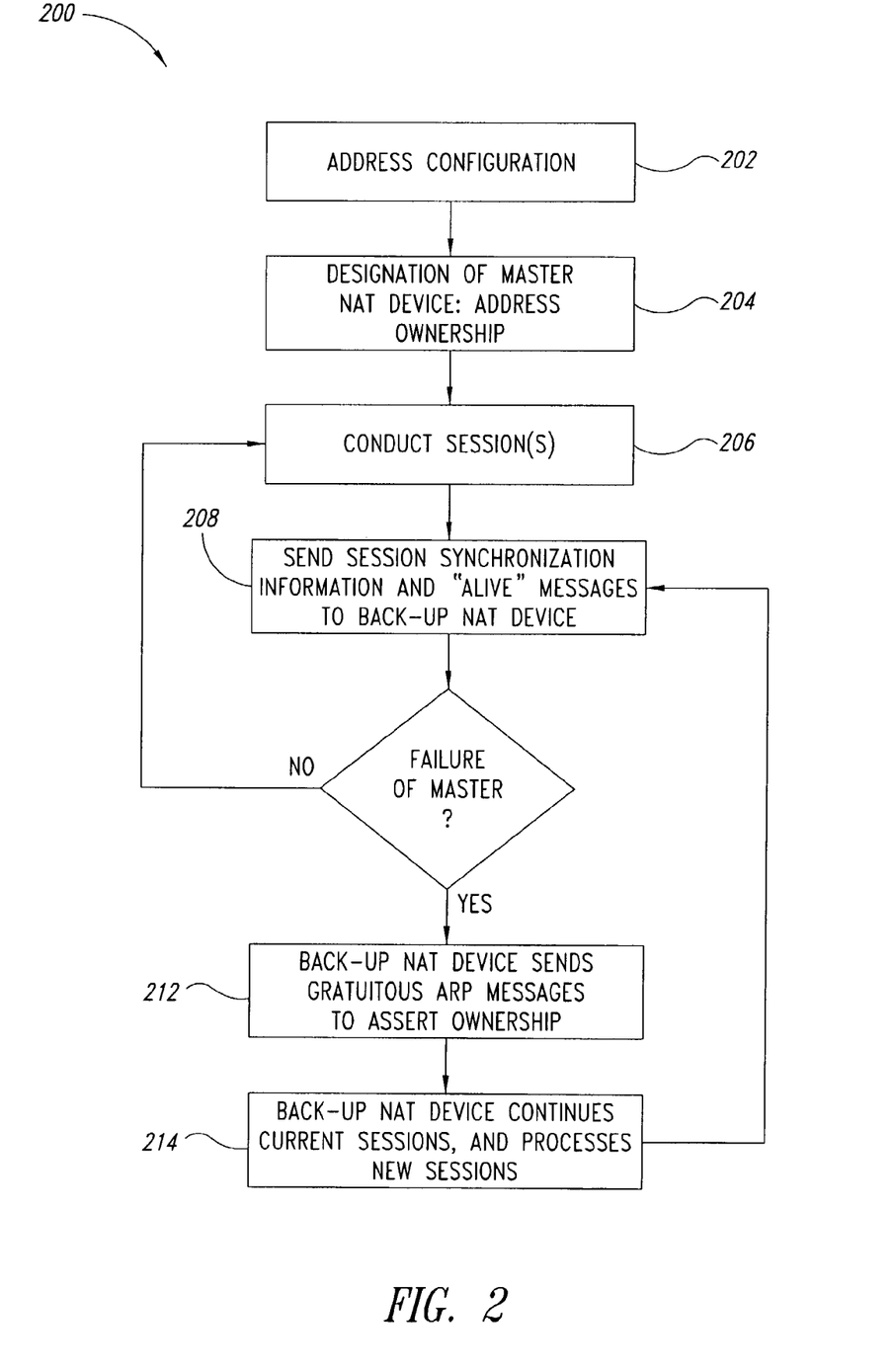
FIG. 2 is a flow chart illustrating operations associated with providing redundancy support for NAT in accordance with one embodiment of the invention.

Operation of the system 100 of FIG. 1 can be further understood by referring next to FIG. 2. FIG. 2 is a flow chart 200 illustrating operations associated with providing redundancy support for NAT in accordance with one embodiment of the invention. At least some of the elements of the flow chart 200 may be embodied in software or other machine-readable instruction stored on a machine-readable medium, such as at the NAT devices 102 and 104. Moreover, some of the operations depicted in the flow chart 200 need not necessarily occur in the exact sequence shown, and may be combined in some instances instead of being separate operations.

Beginning at a block 202, address configuration is performed to provide redundancy support for the NAT addresses. Such configuration may be performed using the example configuration commands explained above, in one embodiment. In general and as explained above, the configuration is performed to resolve address ownership in the event of a failover. For instance, if there is a pool of NAT addresses, the base address is associated to a back-up NAT device during the configuration, and if there is a failover involving any of the IP addresses in the same pool, such IP address(es) are "hooked" to the back-up NAT device by way of the base address. The back-up NAT device can thus perform address translation to and from this IP address, and can also forward traffic associated with this IP address.

At a block 204, the master NAT device is designated. This designation as the master gives that NAT device initial ownership over the NAT address pool and ownership over the virtual IP address(es) for the inside interfaces/ports that communicate with the inside router 114. The back-up NAT device shares, but does not own, these addresses at this point in time. According to one embodiment, the designation of the master can be performed using priority determination schemes that would be familiar to those skilled in the art having the benefit of this disclosure.

At a block 206, sessions are conducted (e.g., the master NAT device forwards traffic). In an active-active configuration, the back-up NAT device is also forwarding its own traffic at the block 206. In an active-standby configuration, the back-up NAT device does not forward traffic.

Concurrently with conducting the sessions at the block 206, the master NAT device sends session synchronization information to the back-up NAT device via the communication link 106. To briefly describe the session information, a session is created in software by the master NAT device each time the client 116 attempts to access an outside destination, such as the Internet 110. The session information logs the destination addresses and other data, which is used in connection with translating the forward and reply traffic and for carrying out further translation. By providing this session information to the back-up NAT device, the back-up NAT device can continue the same sessions in the event of a failover, or can use the session information where asymmetric routing is involved (e.g., the master NAT device forwards outgoing packets and the back-up NAT device receives incoming reply packets).

The session synchronization information may be generated dynamically or "on-demand" whenever new sessions are started. Alternatively or in addition, the session synchronization information may be generated on a scheduled periodic basis.

In addition at the block 208, the master NAT device sends communication messages to the back-up NAT device indicating that it is still "alive" or otherwise active and performing properly (e.g., a type of "heart beat" message or other message indicative of the status of the master NAT device). The heart beat messages may be sent once every second, for instance, or based on some other time interval.

At a block 210, the back-up NAT device monitors for failure of the master NAT device. An event indicative of a failure may be, for instance, a pronounced lapse of time when the heart beat messages are not received from the master NAT device. If the heart beat messages are detected with normal regularity at the block 210 (indicating that there is no failure of the master NAT device), then the process continues as normal at the blocks 206 and 208.

If the back-up NAT device detects a failure of the master NAT device at the block 210, however, then the back-up NAT device asserts itself as the new master at a block 212. In one embodiment, the back-up NAT device becomes the master by asserting ownership over the addresses that were owned by the master NAT device. Asserting ownership involves, in one embodiment, having the back-up NAT device send one or more messages to all of its peers to notify them that it now owns the addresses and that it is to receive all traffic destined for these addresses. In an example embodiment, the messages sent by the back-up NAT device comprise gratuitous address resolution protocol (ARP) messages that are sent to all of the peers (such as hosts) connected to the same Layer 2 domain.

Thereafter at a block 214, the back-up NAT device continues to forward traffic for current sessions that it inherited from the master NAT device, and also forwards or otherwise processes packets for new sessions. For sessions that were being handled by the former master NAT device, the back-up NAT device uses the session information to synchronize into these sessions, thereby allowing the back-up NAT device to transparently "pick up" and continue these on-going sessions.

In an embodiment with multiple levels of redundancy, the back-up NAT device (now the master) can also send session synchronization information or heart beat messages to yet another back-up NAT device (including the original master, if it has come back online) at the block 208. This ensures that if the back-up NAT device itself experiences a failover, the sessions and addresses can be transferred to a suitable back up.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An article of manufacture, comprising:
   a storage medium having instructions stored thereon that are executable by a back-up device to:
   share, by said back-up device with a master device, a base address corresponding to a first pool of first addresses that are owned by said master device;
   perform network address translation (NAT) and routing, by said back-up device, for a second pool of second addresses while said master device is active;
   detect, by said back-up device, a failure of said master device; and
   assert ownership, by said back-up device, of all of said first addresses of said first pool corresponding to said base address, in response to detection by said back-up device of said failure.

2. The article of manufacture of claim 1 wherein said instructions to assert ownership by said back-up device include instructions stored on said storage medium and executable by said back-up device to:
   send a message, by said back-up devices, to peer NAT devices that provides notification that said back-up device is a new master device that owns all of said first addresses of said first pool corresponding to said base address.

3. The article of manufacture of claim 2 wherein said message is a gratuitous address resolution protocol (ARP) message.

4. The article of manufacture of claim 1 wherein said storage medium further includes instructions stored thereon that are executable by said back-up device to:
   receive, by said back-up device from said master device, heartbeat messages while said master device is active, said heartbeat messages being received by said back-up device on a separate virtual local area network (VLAN) connection different from a VLAN connection used to carry traffic.

5. The article of manufacture of claim 1 wherein said storage medium further includes instructions stored thereon that are executable by said back-up device to:
   receive, by said back-up device from said master device, session synchronization information while said master device is active, said session synchronization information being received by said back-up device on a separate virtual local area network (VLAN) connection different from a VLAN connection used to carry traffic.

6. The article of manufacture of claim 1 wherein said storage medium further includes instructions stored thereon that are executable by said back-up device to:
   share, by said back-up device with a peer NAT device, a base address corresponding to said second pool of second addresses, which are owned by said back-up device;
   provide, by said back-up device to said peer NAT device, heartbeat messages and session synchronization information associated with said NAT and routing performed by said back-up device for said second pool of second addresses, said heartbeat messages and session synchronization information being provided by said back-up device to said peer NAT device via at least one virtual local area network (VLAN) connection different than a VLAN used to carry traffic,
   wherein if there is a failure of said back-up device, said failure of said back-up device is detectable from an absence of said heartbeat messages and wherein said session synchronization information provided by said back-up device is usable by said peer NAT device to continue a session that is being carried by said back-up device prior to said failure of said back-up device.

7. The article of manufacture of claim 1 wherein said back-up device is a switch.

8. An article of manufacture, comprising:
   a storage medium having instructions stored thereon that are executable by a master device to:
   share, by said master device with a back-up device that performs routing while said master device is active, a base address corresponding to a first pool of first addresses that are owned by said master device; and
   perform network address translation (NAT) and routing, by said master device, for said first pool of first addresses,
   wherein if there is a failure of said master device with respect to any one of said first addresses, ownership of all of said first addresses of said first pool corresponding to said base address belongs to said back-up device.

9. The article of manufacture of claim 8 wherein said storage medium further includes instructions stored thereon that are executable by said master device to:
   send, by said master device to said back-up device, heartbeat messages while said master device performs NAT and routing for said first pool of addresses, said heartbeat messages being sent by said master device on a separate virtual local area network (VLAN) connection different from a VLAN connection used to carry traffic.

10. The article of manufacture of claim 8 wherein said storage medium further includes instructions stored thereon that are executable by said master device to:
    send, by said master device to said back-up device, session synchronization information while said master device performs NAT and routing for said first pool of addresses, said session synchronization information being sent by said master device on a separate virtual local area network (VLAN) connection different from a VLAN connection used to carry traffic.

11. The article of manufacture of claim 8 wherein said master device is a switch having a separate chassis from said slave device.

* * * * *

UNITED STATES PATENT AND TRADEMARK OFFICE
CERTIFICATE OF CORRECTION

PATENT NO. : 7,647,427 B1 Page 1 of 1
APPLICATION NO. : 10/273657
DATED : January 12, 2010
INVENTOR(S) : Sridhar J. Devarapalli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1467 days.

Signed and Sealed this

Sixteenth Day of November, 2010

David J. Kappos
*Director of the United States Patent and Trademark Office*

US007647427C1

(12) INTER PARTES REEXAMINATION CERTIFICATE (1044th)
United States Patent
Devarapalli (10) Number: US 7,647,427 C1
(45) Certificate Issued: Jan. 29, 2015

(54) REDUNDANT SUPPORT FOR NETWORK ADDRESS TRANSLATION (NAT)

(75) Inventor: Sridhar J. Devarapalli, Sunnyvale, CA (US)

(73) Assignee: Brocade Communications Systems, Inc., San Jose, CA (US)

Reexamination Request:
No. 95/001,803, Nov. 4, 2011

No. 90/011,775, Jun. 27, 2011

Reexamination Certificate for:
Patent No.: 7,647,427
Issued: Jan. 12, 2010
Appl. No.: 10/273,657
Filed: Oct. 18, 2002

Certificate of Correction issued Nov. 16, 2010

(51) Int. Cl.
   *G06F 15/16* (2006.01)
(52) U.S. Cl.
   USPC .............................. 709/245; 709/208; 709/224
(58) Field of Classification Search
   None
   See application file for complete search history.

(56) References Cited

To view the complete listing of prior art documents cited during the proceedings for Reexamination Control Numbers 95/001,803 and 90/011,775, please refer to the USPTO's public Patent Application Information Retrieval (PAIR) system under the Display References tab.

*Primary Examiner* — William H Wood (57) ABSTRACT

Stateful failover redundancy support is provided for network address translation (NAT). A master NAT device is backed-up with at least one back-up NAT device. Existing sessions are synchronized between the two NAT devices, such as via a dedicated link between them. In the event of a failover where the master NAT device is unable to perform its NAT functions, ownership of Internet protocol (IP) addresses is transferred from the master NAT device to the back-up NAT device. The back-up NAT device, which is now owner of the IP addresses, assumes the NAT functionality associated with these IP addresses and continues the existing sessions, as well as processing new sessions.

**Attention is directed to the decision of *Brocade Communications Systems, Inc. et al. v. A10 Networks, Inc. et al.*, 5:10cv3428 (N.D. Cal.) Jun. 10, 2013. This reexamination may not have resolved all questions raised by this decision. See 37 CFR 1.552(c) for *ex parte* reexamination and 37 CFR 1.906(c) for *inter partes* reexamination.**

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 4-6, 9 and 10 is confirmed.

Claims 1-3, 7, 8 and 11 are cancelled.

* * * * *